United States Patent
Enoki et al.

(10) Patent No.: US 10,834,069 B2
(45) Date of Patent: Nov. 10, 2020

(54) IDENTIFICATION FEDERATION BASED SINGLE SIGN-ON

(71) Applicant: INTERNATIONAL BUSINESS MACHINES CORPORATION, Armonk, NY (US)

(72) Inventors: Miki Enoki, Tokyo (JP); Yuji Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 15/251,562

(22) Filed: Aug. 30, 2016

(65) Prior Publication Data
US 2018/0063122 A1 Mar. 1, 2018

(51) Int. Cl.
*H04L 29/06* (2006.01)

(52) U.S. Cl.
CPC ........ *H04L 63/0815* (2013.01); *H04L 63/083* (2013.01)

(58) Field of Classification Search
CPC .................................. H04L 63/0815
USPC ............................................. 726/7
See application file for complete search history.

(56) References Cited

U.S. PATENT DOCUMENTS

| 7,221,935 | B2 | 5/2007 | Barriga-Caceres et al. |
| 7,647,628 | B2 | 1/2010 | Kebinger et al. |
| 7,849,204 | B2 | 12/2010 | Yared et al. |
| 8,214,394 | B2 | 7/2012 | Krishnaprasad et al. |
| 8,756,704 | B2 | 6/2014 | Castellucci et al. |
| 8,769,650 | B2 * | 7/2014 | Gargaro ............. H04L 63/0281 726/8 |
| 9,098,675 | B1 | 8/2015 | Roth et al. |
| 9,461,996 | B2 * | 10/2016 | Hayton ................. G06F 21/31 |
| 10,320,771 | B2 * | 6/2019 | Hande .................. H04L 63/083 |
| 2002/0184507 | A1 | 12/2002 | Makower et al. |

(Continued)

OTHER PUBLICATIONS https://docops.ca.com/ca-single-sign-on/12-52-sp1/en/configuring/partnership-federation/application-integration-at-the-relying-party/redirect-a-user-to-the-target-application-relying-party, Oct. 14, 2015 (Year: 2015).*

(Continued)

*Primary Examiner* — Harris C Wang
(74) *Attorney, Agent, or Firm* — Tutunjian & Bitetto, P.C.; Randall Bluestone (57) ABSTRACT

A computer readable medium having instructions embodied therewith, the instructions executable by a processor or programmable circuitry of a federation server to cause the processor or programmable circuitry to perform operations including configuring a plurality of identification (ID) federations between the federation server and a plurality of applications such that each of the plurality of ID federations is between the federation server and one of the plurality of applications, receiving a first authentication request for authenticating a user who has been authenticated on a first application of the plurality of applications using an ID federation between the first application and the federation server from among the plurality of ID federations, and sending a second authentication request to a second application of the plurality of applications for authenticating the user using an ID federation between the federation server and the second application from among the plurality of ID federations.

20 Claims, 7 Drawing Sheets

(56) References Cited

U.S. PATENT DOCUMENTS

| | | | |
|---|---|---|---|
| 2004/0250118 A1* | 12/2004 | Andreev | H04L 63/0815 726/8 |
| 2006/0218630 A1* | 9/2006 | Pearson | G06F 21/41 726/8 |
| 2008/0072301 A1 | 3/2008 | Chia et al. | |
| 2009/0119763 A1* | 5/2009 | Park | H04L 63/0815 726/8 |
| 2009/0249439 A1 | 10/2009 | Olden et al. | |
| 2011/0208783 A1* | 8/2011 | Dolphin | G06Q 10/06 707/800 |
| 2012/0151568 A1 | 6/2012 | Pieczul et al. | |
| 2012/0210413 A1* | 8/2012 | Akula | H04L 63/0815 726/8 |
| 2012/0216267 A1* | 8/2012 | Austel | H04L 67/2814 726/8 |
| 2013/0086694 A1* | 4/2013 | Agrawal | H04L 67/2838 726/28 |
| 2013/0111042 A1* | 5/2013 | Mani | H04L 12/6418 709/227 |
| 2013/0227140 A1* | 8/2013 | Hinton | H04L 41/00 709/225 |
| 2013/0269017 A1* | 10/2013 | Patil | G06F 21/41 726/8 |
| 2014/0013387 A1 | 1/2014 | Vangpat et al. | |
| 2014/0108474 A1* | 4/2014 | David | G06F 17/30 707/827 |
| 2014/0122616 A1* | 5/2014 | Shang | H04L 51/32 709/206 |
| 2015/0007263 A1 | 1/2015 | Stewart et al. | |
| 2017/0324730 A1 | 11/2017 | Otranen et al. | |
| 2018/0013819 A1 | 1/2018 | Li | |
| 2018/0063122 A1* | 3/2018 | Enoki | H04L 63/0815 |

OTHER PUBLICATIONS

Sebastian Peytrott, What is and how does Single Sign on work?, https://auth0.com/blog/what-is-and-how-does-single-sign-on-work/, Aug. 18, 2016.

U.S. Office Action issued in U.S. Appl. No. 15/656,353 dated Apr. 4, 2009, 18 pages.

U.S. Office Action issued in U.S. Appl. No. 15/804,434 dated Aug. 13, 2019, 8 pages.

Notice of Allowance issued in U.S. Appl. No. 15/804,434 dated Nov. 26, 2019, 10 pages.

* cited by examiner

| Group ID | App ID |
|---|---|
| 1 | App1, App4 |
| 2 | App2, App3 |

*FIG. 5*

| FM ID | App1 ID | App2 ID | App3 ID | App4 ID |
|---|---|---|---|---|
| 1 | miki | Miki_xx | 0425 | miki@xx.com |
| 2 | yuji | Yuji_yy | 5217 | yuji@yy.com |

| ID | Password | E-mail |
|---|---|---|
| Miki_xx | ******** | miki@xx.com |
| Yuji_yy | ******** | yuji@yy.com |

IDENTIFICATION FEDERATION BASED SINGLE SIGN-ON

BACKGROUND

Technical Field

The present invention generally relates to identification federation and, in particular, identification federation based single-sign-on.

Description of the Related Art

Single Sign-On (SSO) reduces the burden of inputting a set of identifications (IDs) and passwords for a plurality of web applications by users. While an authentication server may be used as an ID provider in order to facilitate SSO, the authentication server has to manage IDs and passwords of all users, the number of which may increase drastically as the number of web applications increases. This may require an exhaustive amount of computational resources.

SUMMARY

According to a first aspect of the present invention, a computer readable medium is provided. The computer readable medium includes instructions embodied therewith, the instructions executable by a processor or programmable circuitry of a federation server to cause the processor or programmable circuitry to perform operations including configuring a plurality of ID federations between the federation server and a plurality of applications such that each of the plurality of identification (ID) federations is between the federation server and one of the plurality of applications, receiving a first authentication request for authenticating a user who has been authenticated on a first application of the plurality of applications using an ID federation between the first application and the federation server from among the plurality of ID federations, and sending a second authentication request to a second application of the plurality of applications for authenticating the user using an ID federation between the federation server and the second application from among the plurality of ID federations.

In accordance with an embodiment of the present invention, a method is provided. The method includes configuring a plurality of identification (ID) federations between a federation server and a plurality of applications such that each of the plurality of ID federations is between the federation server and one of the plurality of applications, receiving a first authentication request for authenticating a user who has been authenticated on a first application of the plurality of applications using an ID federation between the first application and the federation server from among the plurality of ID federations, and sending a second authentication request to a second application of the plurality of applications for authenticating the user using an ID federation between the federation server and the second application from among the plurality of ID federations.

In accordance with an embodiment of the present invention, a system is provided. The system includes a configuring section to configure a plurality of identification (ID) federations between a federation server and a plurality of applications such that each of the plurality of ID federations is between the federation server and one of the plurality of applications, a receiving section to receive a first authentication request for authenticating a user who has been authenticated on a first application of the plurality of applications using an ID federation between the first application and the federation server from among the plurality of ID federations, and a sending section to send a second authentication request to a second application of the plurality of applications for authenticating the user using an ID federation between the federation server and the second application from among the plurality of ID federations.

The summary clause does not necessarily describe all features of the embodiments of the present invention. Embodiments of the present invention may also include sub-combinations of the features described above.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
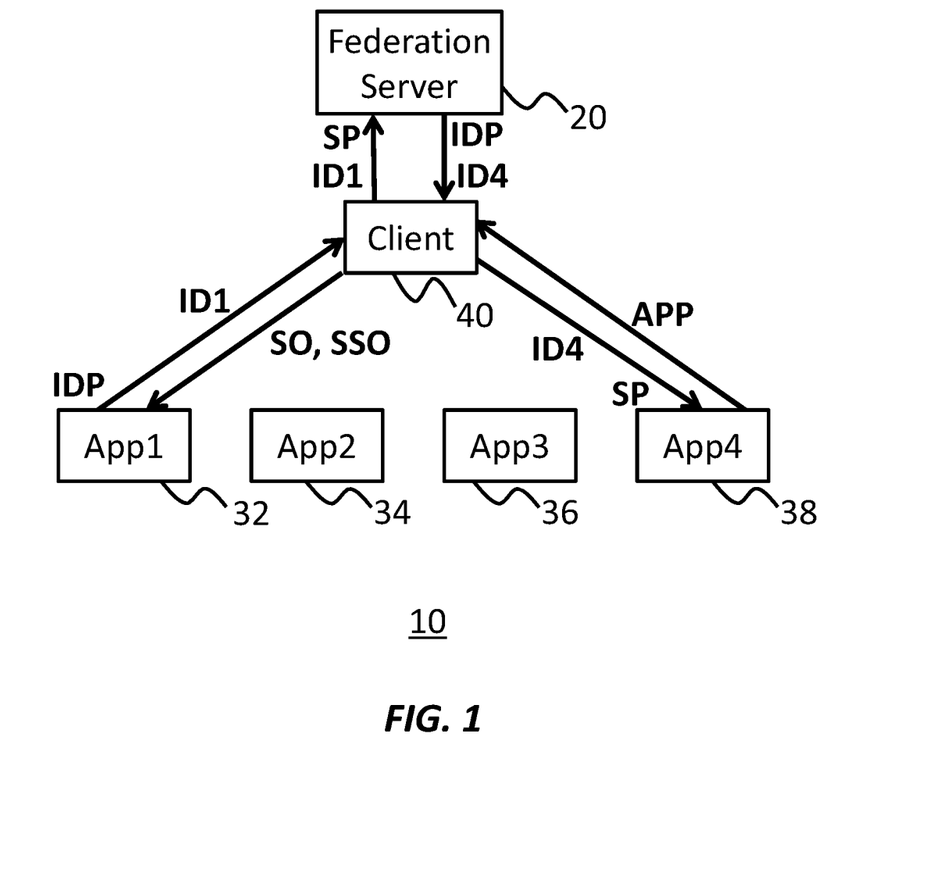
FIG. 1 is a block/flow diagram showing an exemplary system, according to an embodiment of the present invention.

Referring now to the drawings in which like numerals represent the same or similar elements and initially to FIG. 1, an exemplary configuration of a system 10 is shown, in accordance with an embodiment of the present invention. The system 10 may perform SSO based on identification (ID) federations between a federation master and a plurality of applications. The system 10 may comprise a federation server 20 acting as the federation master and a plurality of application servers (e.g., application servers 32, 34, 36 and 38).

In an embodiment, the application server 32 may provide a client computer 40 with an application service 1 (shown as "APP1"), the application server 34 may provide the client computer 40 with an application service 2 (shown as "APP2"), the application server 36 may provide the client computer 40 with an application service 3 (shown as "APP3"), and the application server 38 may provide the client computer 40 with an application service 4 (shown as "APP4"). The client computer 40 may be a desktop computer, a laptop computer, a server computer, a tablet computer, a mobile phone, a smart phone, a mobile device, a personal digital assistant (PDA), a wearable device, a home appliance, a terminal computer, or any other type of computer or device capable of executing an application service.

Each of the application servers 32-38 may require user authentication before providing the client computer 40 with the application service. Without SSO, the client computer 40 has to complete the user authentication for each application whenever the client computer 40 requires each application service.

According to an embodiment of the present invention, the federation server 20 and the application servers 32-38 may perform SSO by operating as both an ID Provider (IDP) and a Service Provider (SP). For example, the federation server 20 and each of the application servers 32-38 may collectively form an ID federation for providing ID information.

The application server 32 may receive authentication information (e.g., a first user ID and a password of user of the client computer 40 used for APP1) from the client computer 40, and authenticate the user based on the authentication information. Then, the application server 32 may receive a sign-on request from the client computer 40.

If the authentication is successful, then the application server 32 may act as the IDP to provide the federation server 20 with the first user ID of the user via the client computer 40. The federation server 20 may act as the SP to receive the ID1 from the IDP, and then may convert the first user ID (e.g., ID1) of the user to a second user ID (e.g., ID4) of the user used for APP4. Conversion of the first user ID to the second user ID may include simply replacing the first user ID with the second user ID without manipulation of the first user ID. The federation server 20 may then act as the IDP to provide the application server 38 with the second user ID of the user via the client computer 40. The application server 38 may act as the SP to receive the second user ID of the user and to provide the client computer 40 with application service of APP4 for the user of the second user ID.

Figure 2:
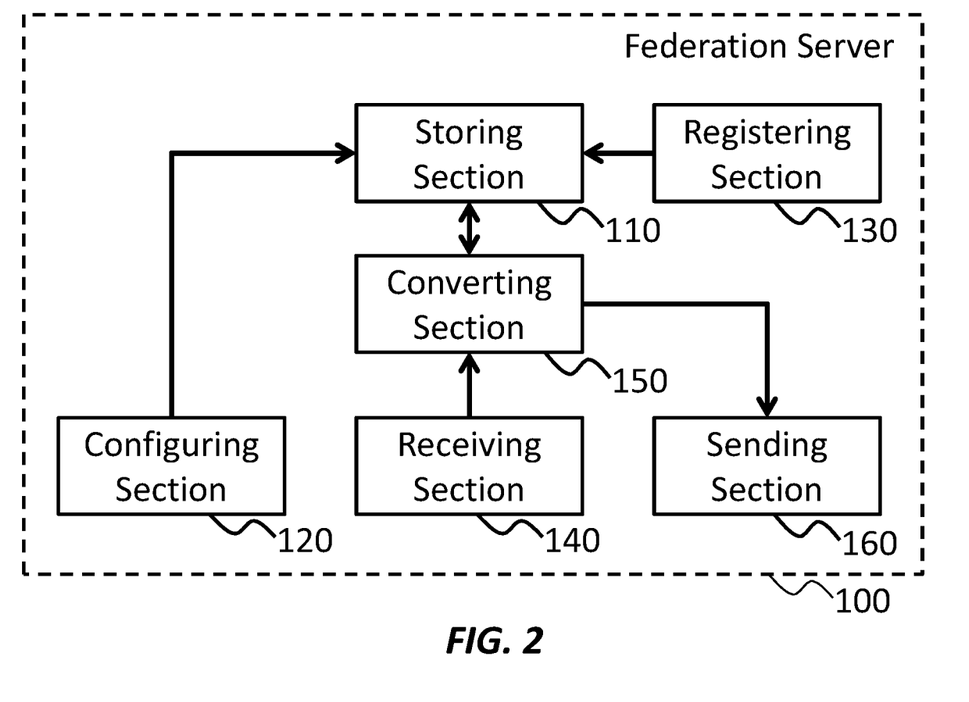
FIG. 2 is a block/flow diagram showing an exemplary configuration of a federation server, according to an embodiment of the present invention.

FIG. 2 shows an exemplary configuration of a federation server 100, according to an embodiment of the present invention. The federation server 20 in FIG. 1 may be implemented by the federation server 100.

The federation server 100 may be an apparatus comprising a processor or programmable circuitry and one or more computer readable mediums collectively including instructions embedded therewith. The instructions, when executed by the processor, may cause the processor or the programmable circuitry of the federation server 100 to operate as a plurality of operating sections. Thereby, the federation server 100 may include a storing section 110, a configuring section 120, a registering section 130, a receiving section 140, a converting section 150, and a sending section 160.

The storing section 110 may store a variety of data used for operations of the federation server 100. In one embodiment, the storing section 110 may comprise a volatile, non-volatile or non-transitory memory, and may be the same computer readable medium on which one or more of the instructions are stored. One or more other operating sections in the federation server 100 (e.g., the configuring section 120 and the converting section 150) may communicate data directly or via the storing section 110.

The configuring section 120 may configure a plurality of ID federations between the federation server 100 and a plurality of applications (e.g., APP1, . . . , APP4 in FIG. 1) such that each ID federation is between the federation server 100 and one of the applications. In one embodiment, the configuring section 120 may perform the configuration before a client computer (e.g., the client computer 40 in FIG. 1) sends a Single Sign-On request (which may be referred to as an SSO request). The configuring section 120 may store a result of the configuration in the storing section 110.

The registering section 130 may receive information relating to an ID mapping of the user, and register the ID mapping of the user. In one embodiment, the ID mapping may indicate at least a correspondence between a first user ID on the first application (e.g., APP1 in FIG. 1) and a second user ID on the second application (e.g., APP4 in FIG. 1). The registering section 130 may receive and store the ID mapping of one or more users for the plurality of application, in the storing section 110.

The receiving section 140 may receive a first authentication request for authenticating a user using an ID federation between a first application and the federation server 100 from among the plurality of ID federations, from the client computer of the user (which may hereinafter be referred to as target user). The first application may be one (e.g., APP1 in FIG. 1) of the plurality of applications (e.g., APP1, . . . , APP4), and the target user has been authenticated on the first application before the client computer of the target user sends the first authentication request.

The first authentication request may include the first user ID of the target user for the first application (e.g., APP1) and an identification of the second application (e.g., APP4), in which the target user wishes to sign-on by SSO. The receiving section 140 may provide the converting section 150 with the received first authentication request including the first user ID directly or via the storing section 110.

The converting section 150 may convert the first user ID indicated in the first authentication request to the second user ID of the second application based on the ID mapping. The second application may be one from among the plurality of ID federations. In one embodiment, the converting section 150 may read the ID mapping stored in the storing section 110, and convert the first user ID of the target user for the first application (e.g., APP1), to the second user ID of the target user for the second application (e.g., APP4). The converting section 150 may provide the sending section 160 with the second user ID of the target user directly or via the storing section 110.

The sending section 160 may send a second authentication request to the second application (e.g., APP4) of the plurality of applications for authenticating the target user using an ID federation between the federation server 100 and the second application.

Figure 3:
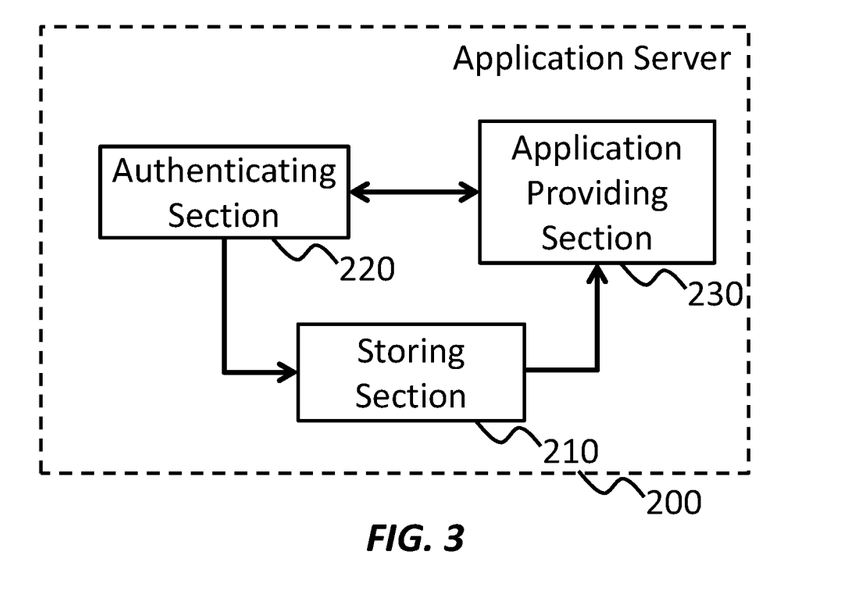
FIG. 3 is a block/flow diagram showing an exemplary configuration of an application server, according to an embodiment of the present invention.

FIG. 3 shows an exemplary configuration of an application server 200, according to an embodiment of the present invention. At least one of the application servers 32-38 in FIG. 1 may be implemented by the application server 200.

The application server 200 may be an apparatus having a processor or programmable circuitry and one or more computer readable mediums collectively including instructions embedded therewith. The instructions, when executed by the processor, may cause the processor or the programmable circuitry of the application server 200 to operate as a plurality of operating sections. Thereby, the application server 200 may be regarded as including a storing section 210, an authenticating section 220, and an application section providing section 230.

The storing section 210 may store a variety of data used for operations of the application server 200. In one embodiment, the storing section 210 may comprise a volatile, non-volatile or non-transitory memory, and may be the same computer readable medium on which one or more of the instructions are stored. One or more other operating sections in the application server 200 (e.g., the authenticating section 220 and the application providing section 230) may communicate data directly or via the storing section 210.

The authenticating section 220 may authenticate the target user on an application. In one embodiment, the authenticating section 220 in the application server 32 (providing APP1 in FIG. 1) may authenticate the target user on the application APP1.

The authenticating section 220 may receive an SSO request from the client computer of the target user. Then, the authenticating section 220 may generate the first authentication request of the target user based on the SSO request.

The authenticating section 220 may send the first authentication request of the target user to the receiving section of the federation server, such as federation server 20. In one embodiment, the authenticating section 220 in the application server 32 may send the first authentication request to the receiving section 140 of the federation server 100 via the client computer, such as client computer 40.

The authenticating section 220 may receive the second authentication request from the sending section, such as sending section 160, of the federation server 100. The authenticating section 220 may complete authentication of the target user on an application based on the second authentication request. In one embodiment, the authenticating section 220 in the application server 38 (providing APP4 in FIG. 1) may authenticate the target user on the application APP4. The authenticating section 220 may provide the application providing section 230 with a result of the authentication, directly or via the storing section 210.

The application providing section 230 may provide the client computer 40 with an application service (e.g., a web application service) based on the result of the authentication. In one embodiment, the application providing section 230 may provide only the client computer of the target user authenticated by the authenticating section 220 with the application service.

Figure 4:
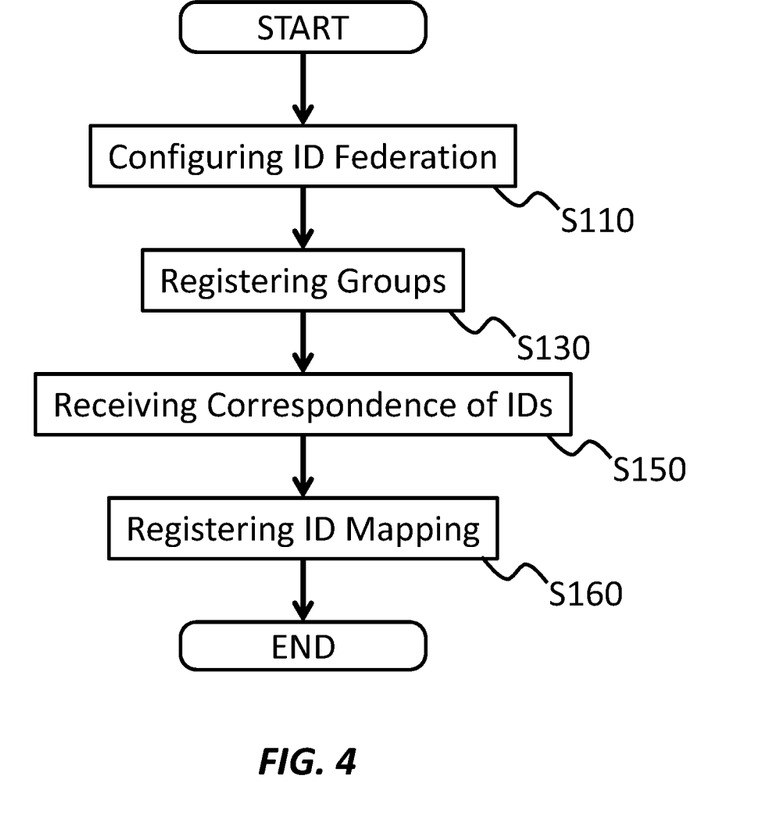
FIG. 4 is a block/flow diagram showing a first operational flow according to an embodiment of the present invention.

FIG. 4 shows a first operational flow according to an embodiment of the present invention. The present embodiment describes an example in which a federation server, such as the federation server 20 and/or 100 performs the operations from S110 to S160, as shown in FIG. 4. The federation server 20, 100 may the configure ID federations and generate the ID mapping by performing the operation of S110-S160. The federation server 20, 100 may perform the operation of FIG. 4 before utilizing the ID federations, as further explained below in FIG. 8.

At S110, a configuring section of a federation server 20, 100 (e.g., the configuring section 120 of the federation server 100 in FIG. 2) may configure a plurality of ID federations between the federation server and a plurality of application servers (e.g., the application servers 32-38 in FIG. 1 and/or the application server 200 in FIG. 3) providing a plurality of applications (e.g., App1-4 in FIG. 1).

In one embodiment, the configuring section 120 may configure an ID federation between the federation server and each application server among the plurality of application servers. In the embodiment, the federation server 20, 100 and each application server 32-38 may authenticate each other. For example, the federation server 20, 100 and each application server 32-38 may perform the authentication by exchanging certificates with each other based on Public-Key Infrastructure (PKI). In another example, the federation server 20, 100 and each application server 32-38 may exchange Security Assertion Markup Language (SAML) metadata that includes a certificate and information of an IDP endpoint.

In one embodiment, the configuring section 120 may configure bidirectional ID federations between the plurality of application servers 32-38 and the federation server 20, 100. In an embodiment, after the authentication, the federation server 20, 100 may register each application server 32-38 both as IDP and SP, and each application server 32-38 may register the federation server 20, 100 both as IDP and SP.

In other embodiments, the configuring section 120 may configure unidirectional ID federations between (i) at least one application server among the plurality of application servers, and (ii) the federation server, and a bidirectional ID federation between (a) the rest of the application servers among the plurality of application servers, and (b) the federation server. In some embodiments, the configuring section 120 may configure a first unidirectional ID federation directed from the application server 32 of the first application (e.g., App1) to the federation server 20, 100 and a second unidirectional ID federation directed from the federation server 20, 100 to the application server 38 of the second application (e.g., App4).

In these embodiments, after or in response to the authentication, the federation server 20, 100 may register the application server 32 of the first application as IDP, and the application server 32 of the first application may register the federation server 20, 100 as SP in the ID federation thereof. Also, the application server 38 of the second application may register the federation server 20, 100 as IDP, and the federation server 20, 100 may register the application server 38 of the second application as SP in the ID federation thereof. Thereby, the federation server 20, 100 may allow a flow of SSO from a relatively secure application to other applications, and ban an opposite flow, such as from an application to a more secure application.

In some embodiments, the configuring section 120 may register a relationship among the plurality of applications, where the relationship defines one or more applications that are allowed to login from each application using the plurality of ID federations. For example, the configuring section 120 may register the relationships of applications to enable an SSO from one application (e.g., application requiring relatively high security) to another application (e.g., application requiring relatively low security) but disable a reciprocal SSO. In one embodiment, the configuring section 120 may receive the relationship(s) from the user of the federation server 20, 100.

At S130, the configuring section 120 may register a group of two or more applications of the plurality of applications. The two or more applications in a group may allow authentications using the plurality of ID federations, as explained later. In one embodiment, the configuring section 120 may register group information of the plurality of applications and the group information may define to which group each of the plurality of applications belongs. In one embodiment, the configuring section 120 may receive the group information by the user of the federation server 20, 100, or the application servers.

Figure 5:
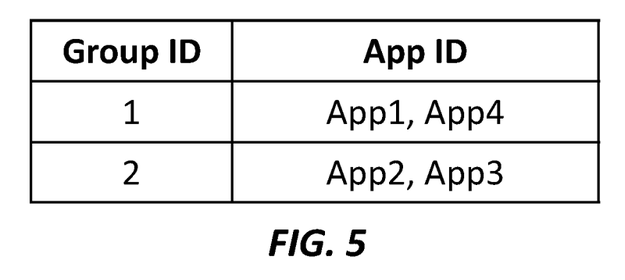
FIG. 5 shows a group table according to an embodiment of the present invention.

FIG. 5 shows a group table according to an embodiment of the present invention. In one embodiment, the configuring section 120 may receive the group information represented by the group table of FIG. 5. In an embodiment, App1 and App4 belong to the same group (e.g., Group 1), and App2 and App3 belong to the same group (e.g., Group 2). The configuring section 120 may store the group information in the storing section 110 of the federation server 20, 100.

With continued reference to FIG. 4, at S150, a registering section, such as the registering section 130 of FIG. 2, may receive correspondence information of IDs of an application and IDs of another application. In one embodiment, the registering section 130 may receive correspondence information of IDs of a plurality of users for all pairs of applications. In an embodiment, the registering section 130 may receive correspondence information of IDs of App1 for a plurality of users and IDs of App2 for a plurality of users, correspondence information of IDs of App1 for a plurality of users and IDs of App3 for a plurality of users, . . . , correspondence information of IDs of App3 for a plurality of users and IDs of App4 for a plurality of users, for App1-App4.

In one embodiment, the registering section 130 may receive correspondence information of an ID of an application and another application of each user. In an embodiment, the registering section 130 may receive correspondence information of an ID of App1 and App2 of a user.

The registering section 130 may receive at least part of the correspondence information from the application server 200 or the client computer 40. In one embodiment, a user of the client computer 40 may first provide the application server 200 with the correspondence information of the user, and the application server 200 may provide the registering section 130 with the correspondence information.

At S160, the registering section 130 may generate ID mapping of the user based on the correspondence information received at S150. Thereby, the registering section 130 may generate a mapping of IDs of users for the plurality of applications.

Figure 6:
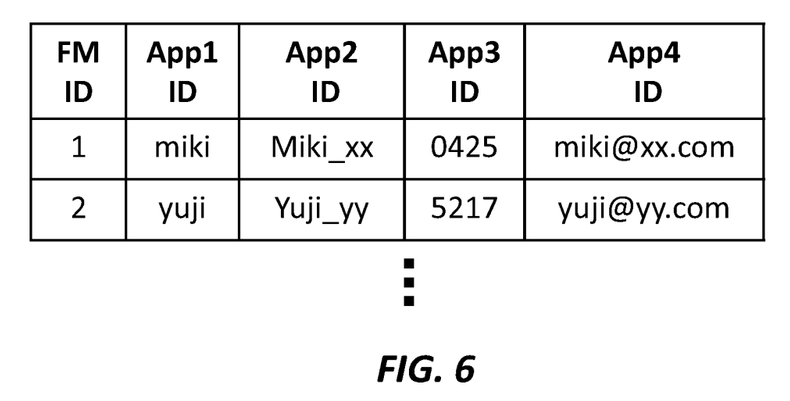
FIG. 6 shows a mapping table according to an embodiment of the present invention.

FIG. 6 shows a mapping table according to an embodiment of the present invention. In one embodiment, the registering section 130 may generate an ID mapping such as the mapping table represented in FIG. 6. In an embodiment, the mapping table includes a federation master (FM) ID, and IDs for the plurality of applications. An FM ID is a user ID used in the federation server 20, 100. According to an embodiment of FIG. 6, the mapping table includes the FM ID, the App1 ID, the App2 ID, the App3 ID, etc.

In an embodiment of FIG. 6, a user allocated the FM ID of "1" has "miki" as the App1 ID, "Miki_xx" as the App2 ID, "0425" as the App3 ID, and "miki@xx.com" as the App4 ID. A user allocated the FM ID of "2" has "yuji" as the App1 ID, "Yuji_yy" as the App2 ID, "5217" as the App3 ID, and "yuji@yy.com" as the App4 ID. In an embodiment, the App1 ID "miki" corresponds to the App2 ID "Miki_xx", the App3 ID "0425", and the App4 ID "miki@xx.com." The registering section 130 may store the ID mapping in the storing section 110 of the federation server 20, 100.

Figure 7:
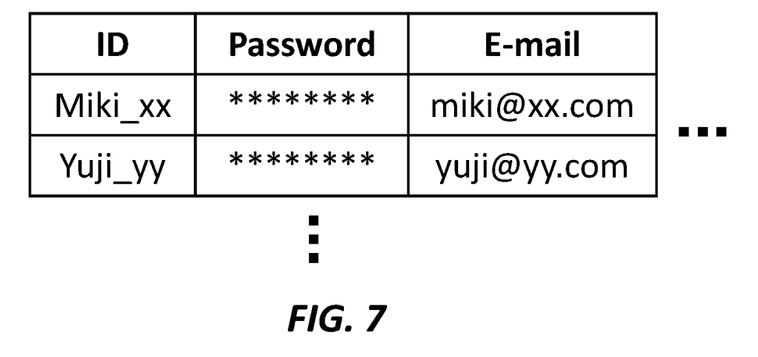
FIG. 7 shows a user table according to an embodiment of the present invention.

FIG. 7 shows a user table according to an embodiment of the present invention. The application server 200 may store user information represented by the user table as shown in FIG. 7. In an embodiment, the application server 200 may store IDs (e.g., log-in ID), passwords, e-mail addresses, and other attributes of a user for each user. In an embodiment, the application server 200 (such as the application server 38) providing App4 may store information of ID "Miki_xx", Password "********", E-mail "miki@xx.com" for a user. In an embodiment, the ID "Miki_xx" is stored as App4 ID in the mapping table of FIG. 6.

As explained in relation to FIGS. 4-7, the federation server 20, 100 may configure ID federations with the plurality of application servers 34-38, and register the groups as well as the ID mapping used for SSO.

Figure 8:
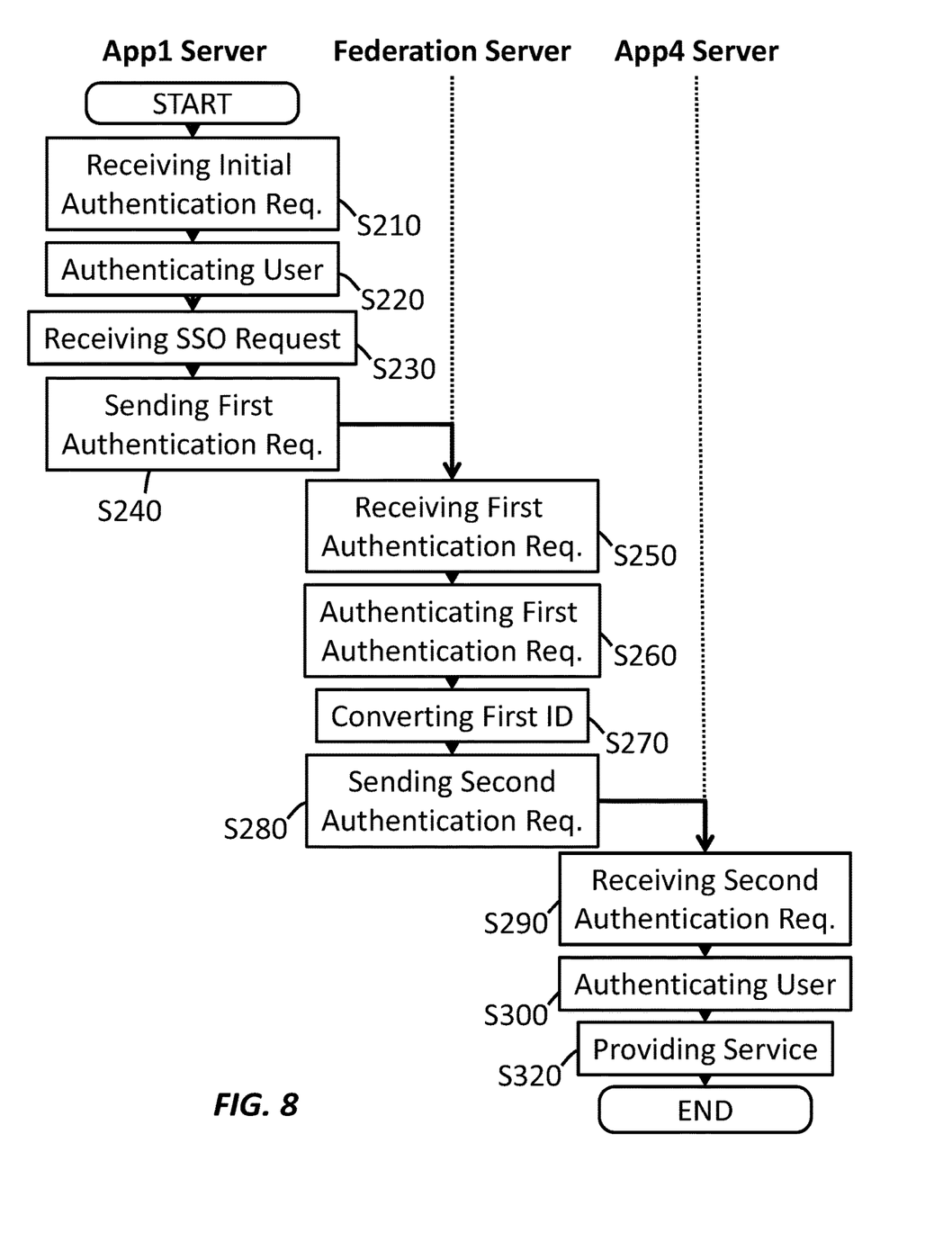
FIG. 8 is a block/flow diagram showing a second operational flow according to an embodiment of the present invention.

FIG. 8 shows a second operational flow according to an embodiment of the present invention. The present embodiment describes an example in which a system, such as the system 10, performs the operations from S210 to S320, as shown in FIG. 8. The system 10 may operate SSO based on ID federation by performing the operations of S210-S320. The system 10 may perform the operations of FIG. 8 after configuring the ID federation and registering the ID mapping (e.g., after at least part of the operational flow of FIG. 4.).

At S210, an authenticating section in an application server, such as the authenticating section 220, may receive an initial authentication request of a target user from a client computer, such as the client computer 40, of the target user. In an embodiment, the authenticating section 220 of the application server providing a first application (e.g., App1) receives an initial authentication request of a target user including a first user ID and password of the target user.

At S220, the authenticating section 220 may authenticate the target user. In an embodiment, the authenticating section 220 may retrieve the target user in the user table, such as the table shown in FIG. 7, by accessing a storing section, such as the storing section 210, and determine whether a pair of the first user ID and the password of the target user included in the initial authentication request exists in the user table of the first application.

If the authentication is successful, the authenticating section 220 may allow the target user to log in to an application of the application server 200 (such as App1) and proceed with an operation of S230. In such case, the authenticating section 220 may cause the application providing section 230 to provide the client computer with the first application before an operation of S230 begins.

In an embodiment, if the authentication is not successful, then the authenticating section 220 may send an error message to the client computer of the target user and end the process of FIG. 8.

At S230, the authenticating section 220 may receive an SSO request from the client computer 40 of the target user. In an embodiment, the authenticating section 220 may provide a website including an SSO request bottom or link having a target Uniform Resource Identifier (URL), and receive the SSO request in response to the target user accessing the target URL by clicking the bottom or the link.

For example, the authenticating section 220 may provide a website of App1 including an SSO request bottom showing a message "Sign-on App4", the bottom including a URL to the federation server 20, 100 and a URL to a second application to which the target user wishes to login (e.g., App4). For example, the bottom may include a target URL such as:
"https://app1.com/jct1/sps/fmtest1/
loginital?RequestBinding=HTTPPost&PartnerId=https://
FM.com/jct1/sps/fmtest1/
sam120&NameIdFormat=Email&Target=https://FM.com/
jct2/sps/f mtest2/sam120/
logininitial?RequestBinding=HTTPPost&PartnerId=https://
app4.com/jct2/sps/fmt est2/
sam120&NameIdFormat=Email&Target=https://app4.com/
ws2/sol2/hello.html" wherein "https://app1.com" corresponds to the application server providing App1, "https://app4.com" corresponds to the application server providing App4, and "https://FM.com" corresponds to the federation server 20, 100.

At S240, the authenticating section 220 may send a first authentication request for authenticating the target user to the federation server 20, 100 via the client computer 40 of the target user. In an embodiment, the authenticating section 220 may send the first authentication request using the bidirectional ID federation between the application server of the first application and the federation server 20, 100. In another embodiment, the authenticating section 220 may send the first authentication request using the first unidirectional ID federation from the application server of the first application to the federation server 20, 100.

The first authenticating request may include at least information of the first user ID of the target user for the first application (e.g., App1) and an identification of the second application (e.g., App4).

In an embodiment, the first authenticating request may be implemented by a cookie and a URL. In an embodiment, the authenticating section 220 may generate a redirect URL including a URL of the federation server 20, 100 further including the second application as a target of the second authentication request as a part of the first authenticating request.

For example, the authenticating section 220 may extract the redirect URL from the target URL that the target user has clicked at S230, and send a redirect command to the client computer 40 of the target user, for causing the client computer 40 to access the redirect URL: "https://FM.com/jct1/sps/fmtest1/ sam120&NameIdFormat=Email&Target=https://FM.com/ jct2/s ps/fmtest2/sam120/ logininitial?RequestBinding=HTTPPost&PartnerId=https:// app4.com/jct2/sps /fmtest2/ sam120&NameIdFormat=Email&Target=https://app4.com/ ws2/sol2/hello.html".

In an embodiment, the authenticating section 220 may also send a cookie including a first user ID of the target user for the first application (e.g., App1 ID "miki" of the target user) to the client computer 40 as at least another part of the first authentication request. The cookie may be sent to the client computer 40 as a token. In some embodiments, the authenticating section 220 may provide the token in a form of a SAML (Security Assertion Markup Language) response.

Then, the client computer 40 may access the federation server 20, 100 (e.g., https://FM.com) based on the redirect command, and provide the federation server 20, 100 with the token including the first user ID of the target user. In an embodiment, the client computer 40 may provide the federation server 20, 100 with the token in the form of a SAML response. In an embodiment, the SAML response of the first authentication request may designate the first application (e.g., App1) as an ID provider (IDP) and the federation server 20, 100 as a service provider (SP).

At S250, a receiving section, such as the receiving section 140 of FIG. 2, may receive the first authentication request from the application server 200 via the client computer 40. In one embodiment, the receiving section 140 may receive the first authentication request for authenticating the target user using bidirectional ID federation. In another embodiment, the receiving section 140 may receive the first authentication request for authenticating the target user using the first unidirectional ID federation.

In an embodiment, the receiving section 140 may obtain at least a first user ID of the target user for the first application as at least a part of the first authentication request and the identification of the second application. For example, the receiving section 140 may receive the first user ID "miki" of the target user for App1 included in the SAML response, and "App4" as the second application included in the redirect URL, from the client computer 40. The receiving section 140 may provide a converting section, such as the converting section 150 of FIG. 2, with the received first authentication request.

At S260, the converting section 150 may authenticate the first authenticating request. The converting section 150 may authenticate (i) first user ID of the target user for the first application and/or (ii) the second application. In an embodiment, the converting section 150 may determine whether the mapping table stored in the storing section 110 includes the first ID of the target user for the first application included in the first authorization request. The converting section 150 may determine whether the first user ID "miki" is included in the App1 ID of the mapping table, such as the mapping table shown in FIG. 6.

In an embodiment, the converting section 150 may determine whether the mapping table includes the second application. For example, the converting section 150 may determine that the mapping table of FIG. 6 includes the second application "App4." In an embodiment, the converting section 150 may further determine whether the first application and the second application are in the same group. For example, the converting section 150 may determine that App1 and App4 are in the same group having Group ID of "1," according to the group table illustrated in FIG. 5.

In an embodiment, if the authentication is successful, then the converting section 150 may proceed with operation of S270, and if not successful, then the converting section 150 may transmit an error message to the application server 200 of the first application (e.g., App1), and end the operation of FIG. 8.

At S270, the converting section 150 may convert the first user ID of the first application to the second user ID of the second application based on the ID mapping of the mapping table. In an embodiment, the converting section 150 may convert the first user ID to the second user ID corresponding to the first user ID in the mapping table stored in the storing section 110. For example, the converting section 150 may convert the first user ID "miki" to the second user ID "miki@xx.com" based on the mapping table of FIG. 6. The converting section 150 may provide a sending section, such as the sending section 160 shown in FIG. 2, with the second user ID.

In some embodiments, the converting section 150 may convert the first user ID to the second user ID by predicting the second user ID from the first user ID based on an ID assignment rule of the second application. In an embodiment, the converting section 150 may predict that the second user ID of the target user is the email address of the target user. In an embodiment, the receiving section 140 may receive the email address of the target user as a part of the first authentication request at S250, and the converting section 150 may convert the first user ID to the email address of the target user.

At S280, the sending section 160 may send a second authentication request for requesting the second application to authenticate the target user, to the application server 200 of the second application via the client computer 40. In an embodiment, the sending section 160 may send the second authentication request using the bidirectional ID federation between the application server of the second application and the federation server 20, 100. In another embodiment, the sending section 160 may send the second authentication request using the second unidirectional ID federation from the federation server 20, 100 to the application server 200 of the second application.

The second authenticating request may include at least information of the second user ID of the target user for the second application (e.g., App4) and a URL of the second application. In an embodiment, the second authenticating request may be implemented by a cookie and a URL. In an embodiment, the sending section 160 may generate a redirect URL including a URL of the second application as a part of the second authenticating request. The redirect URL included in the second authenticating request may be a part of the redirect URL of the first authenticating request.

For example, the sending section 160 may extract the redirect URL of the second authenticating request from the redirect URL of the first authenticating request, and send a redirect command to the client computer 40 of the target user, for causing the client computer 40 to access the redirect URL:

"https://app4.com/jct2/sps/fmtest2/
sam120&NameIdFormat=Email&Target=https://app4.com/
ws 2/sol2/hello.html".

In an embodiment, the sending section 160 may also send a cookie including a second user ID of the target user for the second application (e.g., App4 ID "miki@xx.com" of the target user) to the client computer 40 as at least another part of the second authentication request. The cookie may be sent to the client computer 40 as a token. In some embodiments, the authenticating section 220 may provide the token in a form of a SAML (Security Assertion Markup Language) response.

Then, the client computer 40 may access the application server 200 of the second application (e.g., https://app4.com) based on the redirect command and provide the application server 200 with the token. In an embodiment, the client computer 40 may provide the application server 200 with the token in the form of a SAML response. In an embodiment, the SAML response of the second authentication request may designate the federation server 20, 100 as an IDP and the second application as an SP.

As described above, the converting section 150 does not authenticate the first authentication request unless the first application and the second application are in the same group, in some embodiments. In some embodiments, the sending section 160 may send the second authentication in response to the condition that the first application and the second application are in the same group. In other embodiments, the sending section 160 may confirm groups of the first application and the second application, instead of the converting section 150.

At S290, the application server 200 of the second application may receive the second authentication request. In an embodiment, the authenticating section 220 of the application server 200 may receive the second authentication request.

At S300, the authenticating section 220 of the application server 200 of the second application may authenticate the target user based on the ID federation between the application server 200 of the second application and the federation server 20, 100. In an embodiment, the authenticating section 220 of the application server 200 of App4 may authenticate the target user in response to determining that the second user ID in the second authentication request exists in the user table of the second application.

At S320, the application providing section 230 may provide the client computer 40 of the target user with the application service of the second application.

As described below and as illustrated in FIG. 8, the federation server 20, 100 receives the first authentication request from the application server 200 of the first application based on the ID federation, converts the first user ID to the second user ID, and sends the second authentication request to the application server 200 of the second application based on the ID federation.

According to some embodiments, the application servers 200 and the federation servers 20, 100 may perform both as IDP and SP in a SAML authentication scheme, thereby enabling SSO. Specifically, the federation server 20, 100 may perform as SP in relation to the application server 200 of one application server (e.g., the first application), and as IDP in relation to another application server 200 (e.g., the application server of the second application).

In some embodiments, the federation server 20, 100 may enable SSO by the ID federations with information of correspondences of IDs of users between a plurality of applications. Therefore, the federation server 20, 100 may not need to hold and manage a variety of information of users (e.g., pairs of ID and password of users for all the applications) such as the conventional IDP may do. This may allow the federation server 20, 100 to require less computational resources compared to conventional IDP even as the number of web applications increases.

Figure 9:
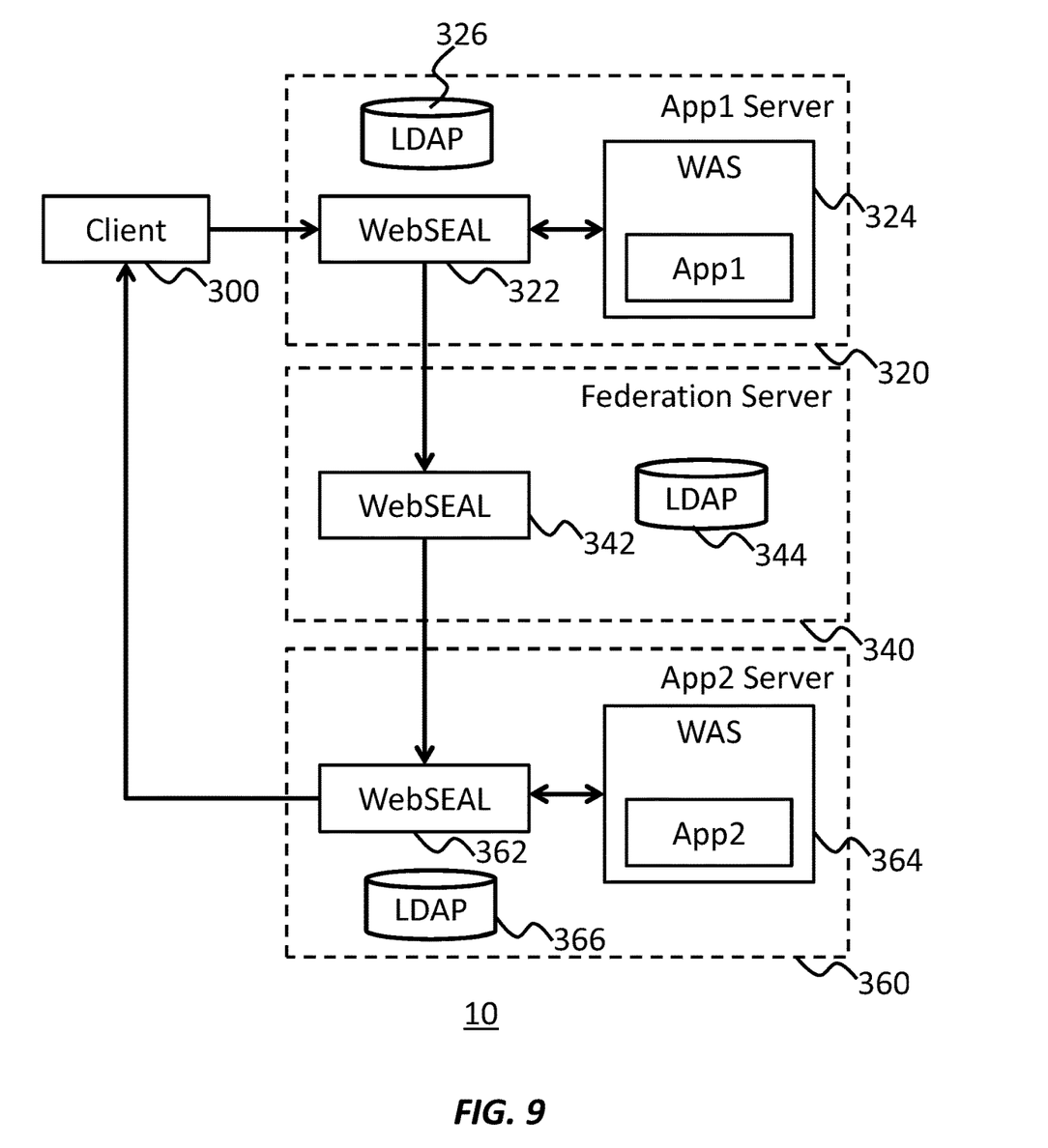
FIG. 9 is a block/flow diagram showing an exemplary system, according to a specific embodiment of the present invention.

FIG. 9 shows an exemplary configuration of a system 10, according to a specific embodiment of the present invention. In an embodiment, the system 10 comprises the application server 320, the federation server 340, and the application server 360. The federation server 340 may be implemented by the federation server 100 in FIG. 2 and the application servers 320, 360 may be implemented by the application server 200 in FIG. 3.

In one embodiment, the application server 320 may be implemented by a plurality of physical servers. In an embodiment, the application server 320 comprises a WebSEAL 322, a Websphere Application Server (WAS) 324, and a Lightweight Directory Access Protocol (LDAP) directory server 326. WebSEAL 322 is a webserver provided by IBM and performs as an authenticating section, such as the authenticating section 220 in FIG. 3. WAS 324 is a webserver provided by IBM and performs as an application providing section, such as the application providing section 220 in FIG. 3.

LDAP directory server 326 is a database server provided by IBM and stores information based on LDAP. LDAP directory server 326 performs as a storing section, such as the storing section 210 in FIG. 3.

The application server 360 comprises a WebSEAL 362, a Websphere Application Server (WAS) 364, and a Lightweight Directory Access Protocol (LDAP) directory server 366, and may have the same configuration as the application server 320. The federation server 340 has WebSEAL 342, which has a configuring section, a registering section, a receiving section, a converting section, and a sending section, such as the configuring section 120, the registering section 130, the receiving section 140, the converting section 150, and the sending section 160 of FIG. 2. The federation server 340 also has an LDAP directory server 344, which performs as a storing section, such as the storing section 110 of FIG. 2. In addition, the system 10 may include client 300.

Figure 10:
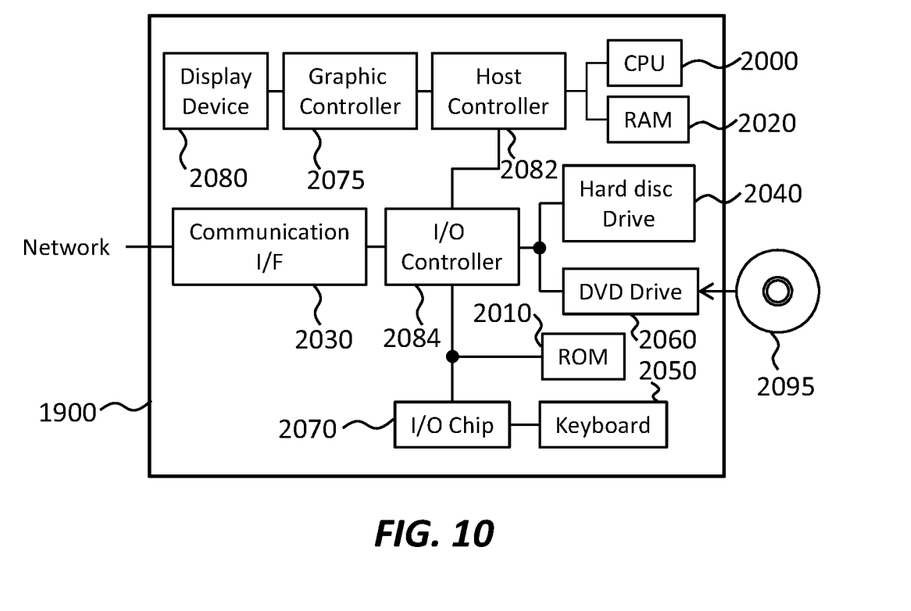
FIG. 10 is a block/flow diagram showing an exemplary hardware configuration of a computer that functions as a system, according to an embodiment of the present invention.

FIG. 10 shows an exemplary configuration of a computer 1900 according to an embodiment of the invention. The computer 1900 according to the present embodiment includes a CPU 2000, a RAM 2020, a graphics controller 2075, and a display device 2080 which are mutually connected by a host controller 2082. The computer 1900 also includes input/output units such as a communication interface (I/F) 2030, a hard disk drive 2040, and a DVD-ROM drive 2060 which are connected to the host controller 2082 via an input/output (I/O) controller 2084. The computer 1900 also includes legacy input/output units such as a ROM 2010 and a keyboard 2050 which are connected to the input/output controller 2084 through an input/output (I/O) chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the client computer 40, the federation server 20, 100, and the application server 32-38, 200 of FIGS. 1-3. The program or module acts on the CPU 2000, to cause the computer 1900 to function as a storing section, a configuring section, a registering section, a receiving section, a converting section, a sending section, an authenticating section, an application providing section, such as the storing section 110, 210, the configuring section 120, the registering section 130, the receiving section 140, the converting section 150, the sending section 160, the authenticating section 220, and the application providing section 230 described above.

The information processing described in these programs is read into the computer 1900, to function as the storing section, the configuring section, the registering section, the receiving section, the converting section, the sending section, the authenticating section, and the application providing section, which are the result of cooperation between the program or module and the above-mentioned various types of hardware resources. Moreover, the apparatus is constituted by realizing the operation or processing of information in accordance with the usage of the computer 1900.

For example, when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060(DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storing section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may determine whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer readable medium having instructions embodied therewith, the instructions executable by a processor or programmable circuitry of a federation server to cause the processor or programmable circuitry to perform operations comprising: configuring, by the federation server, a plurality of identification (ID) federations between the federation server and a plurality of applications, each of the plurality of ID federations being between the federation server and a respective one of the plurality of applications; receiving, by the federation server, a first authentication request via the user's client device from a first application of the plurality of applications for authenticating a user on a second application of the plurality of applications selected by the user, the user having been authenticated on the first application using an ID federation between the first application and the federation server, the first authentication request including an identifier of the second application; and sending, by the federation server, a second authentication request via the users client device to the second application, the second authentication request including authentication information associated with the second application for authenticating the user using an ID federation between the federation server and the second application.

2. The computer readable medium of claim 1, wherein:
configuring includes configuring a first unidirectional ID federation directed from the first application to the federation server and a second unidirectional ID federation directed from the federation server to the second application;
receiving includes receiving the first authentication request for authenticating the user using the first unidirectional ID federation; and
sending includes sending the second authentication request for requesting the second application to authenticate the user using the second unidirectional ID federation.

3. The computer readable medium of claim 1, further comprising:
registering an ID mapping of the user, the ID mapping indicating a correspondence between a first user ID on the first application and a second user ID on the second application; and
converting the first user ID indicated in the first authentication request to the second user ID based on the ID mapping.

4. The computer readable medium of claim 3, further comprising predicting the second user ID from the first user ID based on an ID assignment rule of the second application.

5. The computer readable medium of claim 1, further comprising registering a group of two or more applications of the plurality of applications that allow authentications using the plurality of ID federations, wherein sending includes sending the second authentication in response to a condition that the first application and the second application are in the group.

6. The computer readable medium of claim 1, further comprising registering a relationship among the plurality of applications, the relationship defining one or more applications that are allowed to login from each application using the plurality of ID federations.

7. The computer readable medium of claim 1, wherein:
the first authentication request designates the first application as an ID provider and the federation server as a service provider; and
the second authentication request designates the federation server as an ID provider and the second application as a service provider.

8. The computer readable medium of claim 1, wherein the first authentication request includes a Uniform Resource Identifier (URL) of the federation server including the second application as a target of the second authentication request.

9. A system comprising: a configuring section, of a federation server, to configure a plurality of identification (ID) federations between the federation server and a plurality of applications such that each of the plurality of ID federations is between the federation server and one of the plurality of applications; a receiving section, of the federation server, to receive a first authentication request via the user's client device from a first application of the plurality of applications for authenticating a user on a second application of the plurality of applications selected by the user, the user having been authenticated on the first application using an ID federation between the first application and the federation server, the first authentication request including an identifier of the second application; and a sending section, of the federation server, to send a second authentication request via the user's client device to the second application, the second authentication request including authentication information associated with the second application for authenticating the user using an ID federation between the federation server and the second application.

10. The system of claim 9, wherein:
the configuring section is further configured to configure a first unidirectional ID federation directed from the first application to the federation server and a second unidirectional ID federation directed from the federation server to the second application;
the receiving section is further configured to receive the first authentication request for authenticating the user using the first unidirectional ID federation; and
the sending section is further configured to send the second authentication request for requesting the second application to authenticate the user using the second unidirectional ID federation.

11. The system of claim 9, further comprising one or more application servers operable to execute the plurality of applications.

12. The system of claim 9, further comprising:
a registering section to register an ID mapping of the user, the ID mapping indicating a correspondence between a first user ID on the first application and a second user ID on the second application; and
a converting section to convert the first user ID indicated in the first authentication request to the second user ID based on the ID mapping.

13. A method comprising: configuring, by the federation server, a plurality of identification (ID) federations between a federation server and a plurality of applications such that each of the plurality of ID federations is between the federation server and one of the plurality of applications; receiving, by the federation server, a first authentication request via the user's client device from a first application of the plurality of applications for authenticating a user on a second application of the plurality of applications selected by the user, the user having been authenticated on the first application using an ID federation between the first application and the federation server, the first authentication request including an identifier of the second application; and sending, by the federation server, a second authentication request via the user's client device to the second application, the second authentication request including authentication information associated with the second application for authenticating the user using an ID federation between the federation server and the second application.

14. The method of claim 13, wherein:
configuring includes configuring a first unidirectional ID federation directed from the first application to the federation server and a second unidirectional ID federation directed from the federation server to the second application;
receiving includes receiving the first authentication request for authenticating the user using the first unidirectional ID federation; and
sending includes sending the second authentication request for requesting the second application to authenticate the user using the second unidirectional ID federation.

15. The method of claim 13, further comprising:
registering an ID mapping of the user, the ID mapping indicating a correspondence between a first user ID on the first application and a second user ID on the second application; and
converting the first user ID indicated in the first authentication request to the second user ID based on the ID mapping.

16. The method of claim 15, further comprising predicting the second user ID from the first user ID based on an ID assignment rule of the second application.

17. The method of claim 13, further comprising registering a group of two or more applications of the plurality of applications that allow authentications using the plurality of ID federations, wherein sending includes sending the second authentication in response to a condition that the first application and the second application are in the group.

18. The method of claim 13, further comprising registering a relationship among the plurality of applications, the relationship defining one or more applications that are allowed to login from each application using the plurality of ID federations.

19. The method of claim 13, wherein:
the first authentication request designates the first application as an ID provider and the federation server as a service provider; and
the second authentication request designates the federation server as an ID provider and the second application as a service provider.

20. The method of claim 13, wherein the first authentication request includes a Uniform Resource Identifier (URL) of the federation server including the second application as a target of the second authentication request.

* * * * *